US012600407B2

(12) United States Patent (10) Patent No.: US 12,600,407 B2

Monobe et al. (45) Date of Patent: Apr. 14, 2026

(54) STEERING CONTROL DEVICE

(71) Applicants:JTEKT CORPORATION, Kariya (JP); TOYOTA JIDOSHA KABUSHIKI KAISHA, Toyota (JP)

(72) Inventors: Kaishi Monobe, Toyota (JP); Kenichi Abe, Okazaki (JP); Yuuta Kajisawa, Okazaki (JP); Kazuma Hasegawa, Anjo (JP); Takashi Koudai, Okazaki (JP); Mika Ikeya, Okazaki (JP); Masaharu Yamashita, Toyota (JP); Shintaro Takayama, Toyota (JP); Yosuke Yamashita, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 26 days.

(21) Appl. No.: 18/668,503

(22) Filed: May 20, 2024

(65) Prior Publication Data

US 2024/0400133 A1 Dec. 5, 2024

(30) Foreign Application Priority Data

May 29, 2023 (JP) ................................. 2023-087954

(51) Int. Cl.
B62D 6/00 (2006.01)
B62D 1/28 (2006.01)
(52) U.S. Cl.
CPC ............... B62D 6/008 (2013.01); B62D 1/28 (2013.01)
(58) Field of Classification Search
CPC ............................ B62D 5/0457; B62D 5/0481
See application file for complete search history.

(56) References Cited

U.S. PATENT DOCUMENTS

| | | | |
|---|---|---|---|
| 8,645,022 B2 | 2/2014 | Yoshimura et al. | |
| 12,214,830 B2 * | 2/2025 | Nagashima | .......... B62D 5/0409 |
| 2019/0202468 A1 * | 7/2019 | Kaji | ..................... B60W 40/08 |
| 2023/0117373 A1 | 4/2023 | Nagashima et al. | |
| 2023/0119506 A1 | 4/2023 | Hasegawa et al. | |
| 2023/0130839 A1 * | 4/2023 | Nagashima | .......... B62D 5/0463 |
| | | | 701/41 |
| 2023/0246491 A1 * | 8/2023 | Mizumori | ........... H02J 7/00034 |
| | | | 307/104 |

(Continued)

FOREIGN PATENT DOCUMENTS

JP 2006-321434 A 11/2006

OTHER PUBLICATIONS

Nov. 4, 2024 Extended Search Report issued in European Patent Application No. 24177646.7.

*Primary Examiner* — Long T Tran
(74) *Attorney, Agent, or Firm* — Oliff PLC

(57) ABSTRACT

A steering control device includes a control circuit that controls driving of a reaction force motor that generates steering reaction force that is given to a steering wheel, dynamic power transmission being not performed between the steering wheel and a turning wheel of a vehicle. The control circuit requests a vehicle control device to stop operation of a powertrain in a case where a vehicle electric power source has been turned on and where exchange of information has been performed with the vehicle control device so as not to follow a preset pattern. The vehicle control device controls traveling of the vehicle. The powertrain includes a traveling drive source of the vehicle.

13 Claims, 11 Drawing Sheets

(56)          References Cited

U.S. PATENT DOCUMENTS

2023/0272767 A1 *   8/2023  Chimbe  .............. F02N 11/0851
                                        123/185.1
2024/0339997 A1 *  10/2024  Shapiro  ............... H03K 17/063

* cited by examiner

FIG. 10

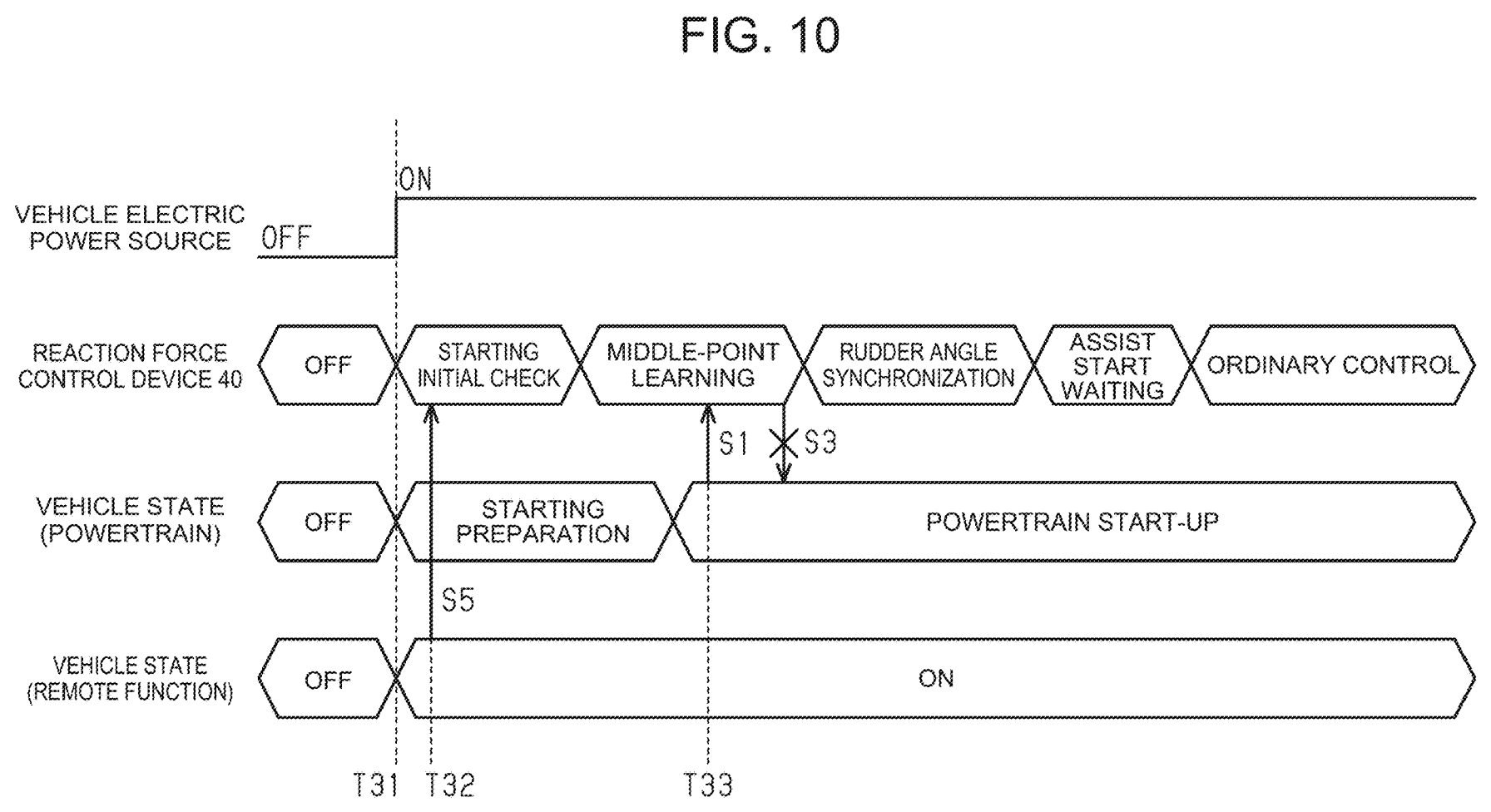

| VEHICLE ELECTRIC POWER SOURCE | OFF | ON |  |  |  |  |  |
|---|---|---|---|---|---|---|---|
| REACTION FORCE CONTROL DEVICE 40 | OFF | STARTING INITIAL CHECK | MIDDLE-POINT LEARNING | RUDDER ANGLE SYNCHRONIZATION | ASSIST START WAITING | ORDINARY CONTROL |
| VEHICLE STATE (POWERTRAIN) | OFF | STARTING PREPARATION | POWERTRAIN START-UP |
| VEHICLE STATE (REMOTE FUNCTION) | OFF | ON |

STEERING CONTROL DEVICE

CROSS-REFERENCE TO RELATED APPLICATION

This application claims priority to Japanese Patent Application No. 2023-087954 filed on May 29, 2023, incorporated herein by reference in its entirety.

BACKGROUND

1. Technical Field

The present disclosure relates to a steering control device.

2. Description of Related Art

Conventionally, there is a so-called steer-by-wire type steering device in which dynamic power transmission is not performed between a steering wheel and a turning wheel (see, Japanese Unexamined Patent Application Publication No. 2006-321434, for example). The steering device includes a reaction force mechanism including a reaction force motor that generates steering reaction force that is given to a steering shaft and a turning mechanism including a turning motor that generates turning force that turns the turning wheel. At the time of the traveling of the vehicle, a control device of the steering device generates the steering reaction force through an electricity supply control for the reaction force motor, and turns the turning wheel through the electricity supply control for the turning motor.

For the vehicle, a higher crime prevention performance is required. Also for the steering device equipped in the vehicle, it is demanded to enhance the crime prevention performance.

SUMMARY

A steering control device that can solve the above problem includes a control circuit configured to control driving of a reaction force motor that generates steering reaction force that is given to a steering wheel, dynamic power transmission being not performed between the steering wheel and a turning wheel of a vehicle. The control circuit is configured to request a vehicle control device to stop operation of a powertrain in a case where a vehicle electric power source has been turned on and where exchange of information has been performed with the vehicle control device so as not to follow a preset pattern, the vehicle control device controlling traveling of the vehicle, the powertrain including a traveling drive source of the vehicle. The control circuit is configured to not request the vehicle control device to stop the operation of the powertrain, even when the exchange of the information has been performed with the vehicle control device so as not to follow the preset pattern in a case where the vehicle electric power source has been turned on and where the vehicle is not in a state of being capable of traveling.

For example, there is concern that the information that is exchanged between the control circuit and the vehicle control device has been faked due to some kind of malfeasance. Further, there is concern that the vehicle control device outputs the information at an improper timing due to some kind of cause. In this regard, in the above configuration, when the exchange of the information has been performed between the control circuit and the vehicle control device so as not to follow the preset pattern, the operation of the powertrain is stopped. The vehicle can travel by the dynamic power of the traveling drive source, and therefore, crime prevention performance is enhanced. However, even when the exchange of the information has been performed between the control circuit and the vehicle control device so as not to follow the preset pattern, the vehicle control device is not requested to stop the operation of the powertrain, in the case where the vehicle is not in the state of being capable of traveling. Since the vehicle is not in the state of being capable of traveling, safety or crime prevention performance can be secured.

In the above steering control device, the case where the vehicle is not in the state of being capable of traveling may be a case where the shift range of the vehicle is not a shift range that allows the traveling. In this configuration, in the case where the shift range of the vehicle is not the shift range that allows the traveling, the vehicle cannot travel by the dynamic power of the traveling drive source. The shift range is a condition appropriate to determine whether the vehicle is in the state of being capable of traveling.

In the above steering control device, the vehicle may have a remote function to remotely operate an electronic apparatus equipped in the vehicle using wireless communication when the vehicle is in a parked state. In this case, the case where the vehicle is not in the state of being capable of traveling may be a case where the remote function has been turned on.

In this configuration, the remote function is used, for example, when the vehicle is in the parking state. Therefore, in the case where the remote function has been turned on, the vehicle is in the parking state, that is, in a state where the vehicle cannot travel by the dynamic power of the traveling drive source. The turning-on of the remote function is a condition appropriate to determine whether the vehicle is in the state of being capable of traveling.

In the above steering control device, the control circuit may be configured to permit the vehicle control device to start up the powertrain in a case where execution of a preparation process has been completed, the preparation process being executed at a time when the vehicle electric power source has been turned on, and transition to an ordinary control state in a case where the control circuit has recognized start-up of the powertrain through the vehicle control device, the ordinary control state being a state where a reaction force control to cause the reaction force motor to generate the steering reaction force is executed.

In this configuration, the control circuit permits the vehicle control device to start up the powertrain, in the case where the preparation process for the reaction force control has been completed. That is, the vehicle control device starts up the powertrain, after the start-up of the powertrain is permitted by the control circuit. Therefore, the vehicle can travel only after the completion of the preparation process for the control circuit. Accordingly, the traveling of the vehicle can be started in a safer state for a driver.

In the above steering control device, the control circuit may be configured to request the vehicle control device to stop the operation of the powertrain in a case where the control circuit has not permitted the vehicle control device to start up the powertrain and where the control circuit has recognized the start-up of the powertrain through the vehicle control device.

In the case where the start-up of the powertrain has been recognized even though the control circuit has not permitted the vehicle control device to start up the powertrain, there is a risk that the permission to the vehicle control device has been faked by malfeasance such as spoofing, for example. In this regard, in the above configuration, when there is a risk that the permission to the vehicle control device has been faked, the control circuit requests the vehicle control device to stop the operation of the powertrain. The vehicle control device stops the operation of the powertrain in response to the request from the control circuit, and thereby, crime prevention performance is enhanced.

In the above steering control device, the vehicle may have a remote function to remotely operate an electronic apparatus equipped in the vehicle using wireless communication when the vehicle is in a parked state. In this case, the vehicle control device may be configured to start up the powertrain without permission by the control circuit in a case where the remote function has been turned on.

In the case where this configuration is employed, when the remote function has been turned on, the powertrain is started up without the permission by the control circuit. Therefore, there is a risk that the control circuit requests the vehicle control device to stop the operation of the powertrain. However, in the case where the vehicle is not in the state of being capable of traveling, the control circuit does not request the vehicle control device to stop the operation of the powertrain, even when the powertrain has been started up without the permission by the control circuit. Therefore, the start-up of the powertrain due to the turning-on of the remote function is allowed, with the securement of the function to stop the operation of the powertrain in the case where the powertrain has been started up without the permission by the control circuit. Accordingly, the convenience for a user of the vehicle is secured.

In the above steering control device, the preparation process may include: a middle-point learning process of learning a steering neutral position of the steering wheel by causing the steering wheel to operate to a first operation end and thereafter causing the steering wheel to reversely operate to a second operation end; and a rudder angle synchronization process of correcting the rotational position of the steering wheel such that the rotational position of the steering wheel corresponds to the turning position of the turning wheel.

For example, in the case where the traveling of the vehicle has been started even though the control circuit is executing the middle-point learning process or the rudder angle synchronization process, there is a risk that it is difficult for the driver to operate the steering wheel in an intended steering direction. This is because the steering wheel automatically rotates during the execution of the middle-point learning process or during the execution of the rudder angle synchronization process. In this regard, in the above configuration, the control circuit permits the vehicle control device to start up the powertrain, in the case where the preparation process for the reaction force control has been completed. Therefore, the vehicle can travel only after the completion of the preparation process for the control circuit. Accordingly, the traveling of the vehicle can be started in a safer state for a driver. A feeling of strangeness is not given to the driver.

With the steering control device in the present disclosure, crime prevention performance can be enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 10 is a time chart showing a fifth pattern of the starting sequences in the reaction force control device and the vehicle control device in the embodiment; and FIG. 11 is a time chart showing a sixth pattern of the starting sequences in the reaction force control device and the vehicle control device in the embodiment.

DETAILED DESCRIPTION OF EMBODIMENTS

Figure 1:
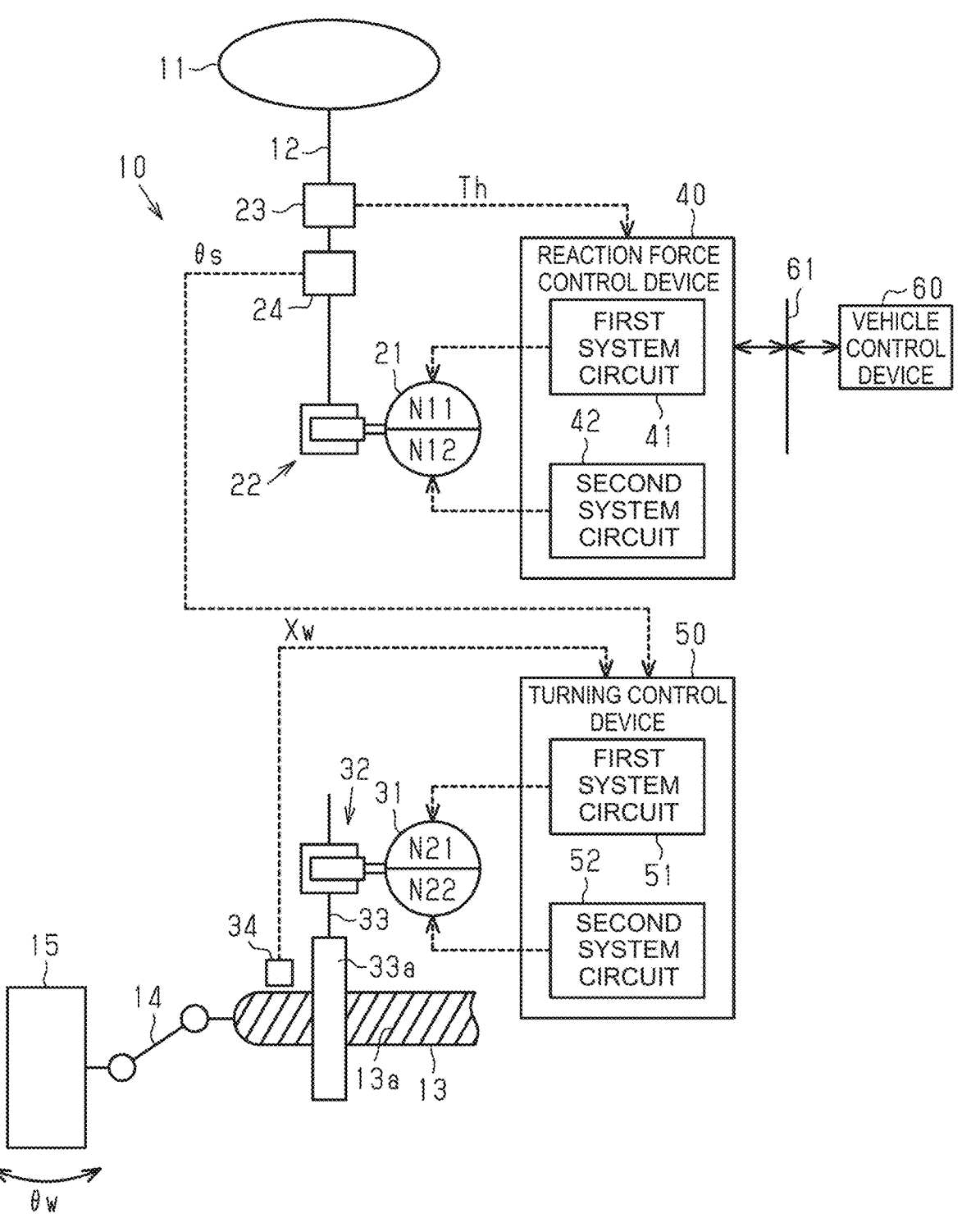
FIG. 1 is a configuration diagram of a steer-by-wire type steering device equipped with an embodiment of a steering control device.

An embodiment in which a steering control device is embodied as a steer-by-wire type steering device will be described below. As shown in FIG. 1, a steering device 10 of a vehicle includes a steering shaft 12 coupled to a steering wheel 11. Further, the steering device 10 includes a turning shaft 13 that extends along a vehicle width direction (a right-left direction in FIG. 1). Turning wheels 15 are coupled to both ends of the turning shaft 13 through tie rods 14, respectively. By the rectilinear motion of the turning shaft 13, a turning angle θw of the turning wheels 15 is changed. The steering shaft 12 and the turning shaft 13 constitute a steering mechanism of the vehicle. However, dynamic power transmission is not performed between the steering shaft 12 and the turning shaft 13, and further between the steering wheel 11 and the turning wheels 15. In FIG. 1, only the turning wheel 15 on one side is illustrated.

The steering device 10 includes a reaction force motor 21 and a speed reduction mechanism 22. The reaction force motor 21 is a generation source of steering reaction force. The steering reaction force is force that acts in the opposite direction of the direction of the operation of the steering wheel 11 by a driver. A rotation shaft of the reaction force motor 21 is coupled to the steering shaft 12 through the speed reduction mechanism 22. The torque of the reaction force motor 21 is given to the steering shaft 12 as the steering reaction force. By giving the steering reaction force to the steering wheel 11, a moderate hand response can be given to the driver.

For example, the reaction force motor 21 is a three-phase brushless motor. The reaction force motor 21 includes a winding group N11 of a first system and a winding group N12 of a second system. The winding group N11 of the first system and the winding group N12 of the second system are wound around a common stator (not illustrated). The winding group N11 of the first system and the winding group N12 of the second system have an equivalent electric characteristic.

The steering device 10 includes a turning motor 31 and a speed reduction mechanism 32. The turning motor 31 is a generation source of turning force. The turning force is dynamic power for turning the turning wheel 15. A rotation shaft of the turning motor 31 is coupled to a pinion shaft 33 through the speed reduction mechanism 32. A pinion tooth 33a of the pinion shaft 33 engages with a rack tooth 13a of the turning shaft 13. The torque of the turning motor 31 is given to the turning shaft 13 through the pinion shaft 33 as the turning force. The turning shaft 13 moves along the vehicle width direction, depending on the rotation of the turning motor 31.

For example, the turning motor 31 is a three-phase brushless motor. The turning motor 31 includes a winding group N21 of the first system and a winding group N22 of the second system. The winding group N21 of the first system and the winding group N22 of the second system are wound around a common stator (not illustrated). The winding group N21 of the first system and the winding group N22 of the second system have an equivalent electric characteristic.

The steering device 10 includes a reaction force control device 40. The reaction force control device 40 controls the driving of the reaction force motor 21 that is a control object. The reaction force control device 40 executes a reaction force control to cause the reaction force motor 21 to generate the steering reaction force depending on a steering torque Th. The reaction force control device 40 calculates a target steering reaction force based on the steering torque Th that is detected through a torque sensor 23. The torque sensor 23 is provided at the steering shaft 12. The reaction force control device 40 controls the electricity supply to the reaction force motor 21 such that the actual steering reaction force that is given to the steering shaft 12 coincides with the target steering reaction force. The reaction force control device 40 controls the electricity supply to the winding groups of the two systems in the reaction force motor 21, independently for each system.

The reaction force control device 40 includes a first system circuit 41 and a second system circuit 42. The first system circuit 41 controls the electricity supply to the winding group N11 of the first system in the reaction force motor 21, depending on the steering torque Th that is detected through the torque sensor 23. The second system circuit 42 controls the electricity supply to the winding group N12 of the second system in the reaction force motor 21, depending on the steering torque Th that is detected through the torque sensor 23.

The reaction force control device 40 and a vehicle control device 60 equipped in the vehicle are connected to each other through an in-vehicle network 61. For example, the in-vehicle network 61 is a controller area network (CAN). The reaction force control device 40 and the vehicle control device 60 equipped in the vehicle exchange information with each other through the in-vehicle network 61. The vehicle control device 60 controls the traveling of the vehicle. Specifically, the vehicle control device 60 controls the powertrain of the vehicle, for example. The powertrain includes a traveling drive source of the vehicle and a dynamic power transmission mechanism. For example, the traveling drive source includes an engine or a motor. The drive power transmission mechanism is a mechanism that transmits the dynamic power generated by the traveling drive source, to drive wheels. The reaction force control device 40 controls the driving of the reaction force motor 21, based on the information that is exchanged with the vehicle control device 60.

The steering device 10 includes a turning control device 50. The turning control device 50 controls the driving of the turning motor 31 that is a control object. The turning control device 50 executes a turning control to cause the turning motor 31 to generate the turning force for turning the turning wheel 15 depending on the steering state. The turning control device 50 takes a steering angle θs that is detected through a rudder angle sensor 24 and a stroke Xw of the turning shaft 13 that is detected through a stroke sensor 34. The stroke Xw is a displacement amount from a neutral position of the turning shaft 13, and is a state variable that reflects the turning angle θw. The rudder angle sensor 24 is provided between the torque sensor 23 at the steering shaft 12 and the speed reduction mechanism 22. The stroke sensor 34 is provided near the turning shaft 13.

The turning control device 50 calculates a target turning angle of the turning wheel 15 based on the steering angle θs that is detected through the rudder angle sensor 24. The turning control device 50 calculates the turning angle θw based on the stroke Xw of the turning shaft 13 that is detected through the stroke sensor 34. The turning control device 50 controls the electricity supply to the turning motor 31 such that the turning angle θw that is calculated based on the stroke Xw coincides with the target turning angle. The turning control device 50 controls the electricity supply to the winding groups of the two systems in the turning motor 31, independently for each system.

The turning control device 50 includes a first system circuit 51 and a second system circuit 52. The first system circuit 51 controls the electricity supply to the winding group N21 of the first system in the turning motor 31, based on the steering angle θs that is detected through the rudder angle sensor 24 and the stroke Xw of the turning shaft 13 that is detected through the stroke sensor 34. The second system circuit 52 controls the electricity supply to the winding group N22 of the second system in the turning motor 31, based on the steering angle θs that is detected through the rudder angle sensor 24 and the stroke Xw of the turning shaft 13 that is detected through the stroke sensor 34.

The reaction force control device 40 and the reaction force motor 21 may be integrally provided, and thereby, a so-called mechanically and electrically integrated reaction force actuator may be configured. Further, the turning control device 50 and the turning motor 31 may be integrally provided, and thereby, a so-called mechanically and electrically integrated turning actuator may be configured. The reaction force control device 40 and the turning control device 50 constitute the steering control device.

Reaction Force Control Device

Figure 2:
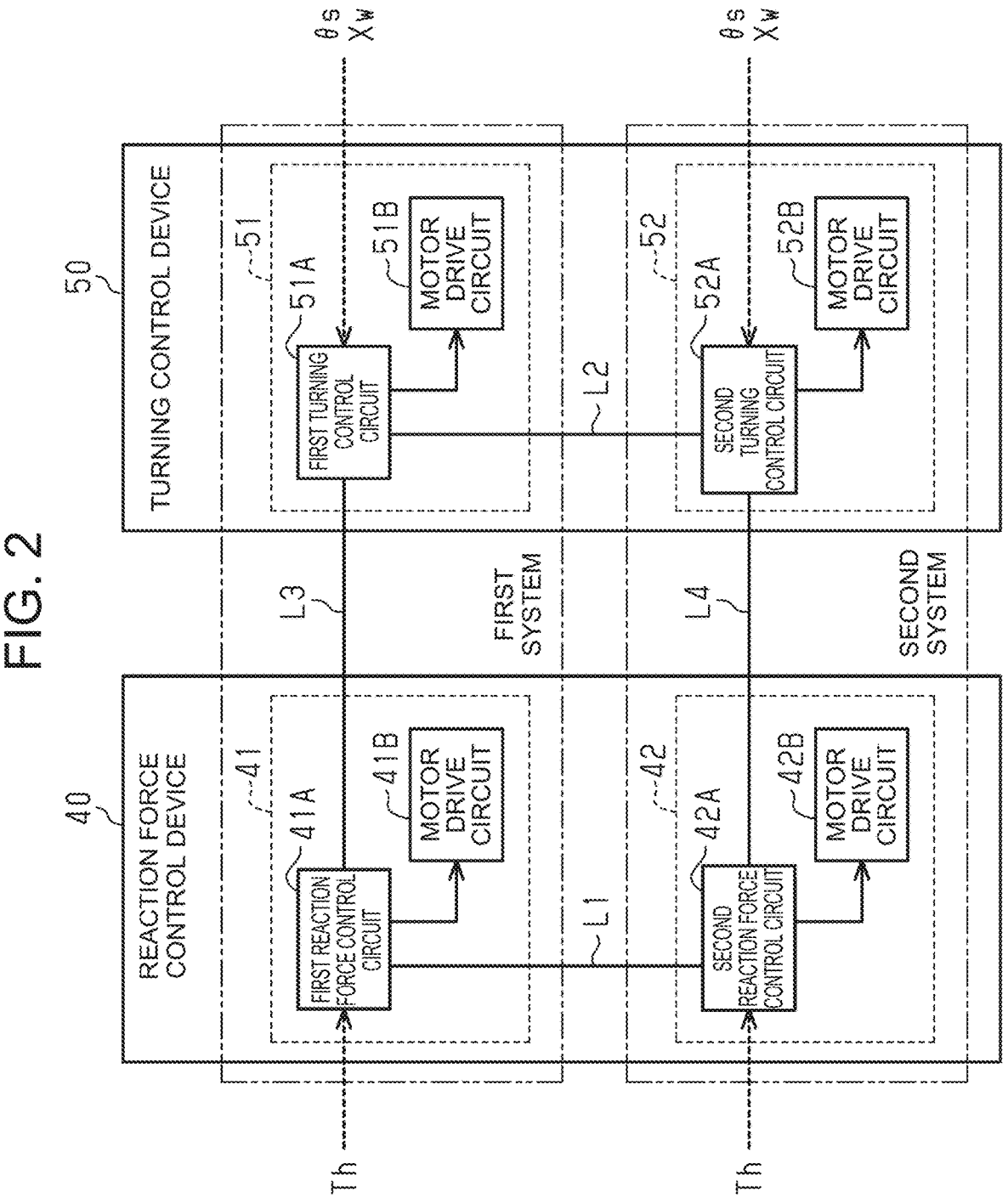
FIG. 2 is a block diagram of a reaction force control device and a turning control device in the embodiment.

Next, the configuration of the reaction force control device will be described in detail. As shown in FIG. 2, the reaction force control device 40 includes the first system circuit 41 and the second system circuit 42. The first system circuit 41 includes a first reaction force control circuit 41A and a motor drive circuit 41B. The second system circuit 42 includes a second reaction force control circuit 42A and a motor drive circuit 42B.

The first reaction force control circuit 41A is configured by a processing circuit including (i) one or more processors that operate in accordance with computer programs (software), (ii) one or more dedicated hardware circuits such as application specific integrated circuits (ASIC) that execute at least some processes of various processes, and (iii) combinations of them. The processor includes a central processing unit (CPU). Further, the processor includes a memory such as a random-access memory (RAM) and a read-only memory (ROM). The memory stores program codes or commands configured to cause the CPU to execute processes. The memory, that is, a non-transitory computer-readable medium includes all utilizable media that can be accessed by general-purpose or dedicated computers.

The first reaction force control circuit 41A calculates the target steering reaction force that needs to be generated by the reaction force motor 21, based on the steering torque Th that is detected through the torque sensor 23. The first reaction force control circuit 41A calculates a first current command value to the winding group N11 of the first system, depending on the calculated value of the target steering reaction force. The first current command value is set to half (50%) of a current amount (100%) that is necessary for the reaction force motor 21 to generate the target steering reaction force. The first reaction force control circuit 41A executes such a current feedback control that the actual value of the electric current that is supplied to the winding group N11 of the first system follows the first current command value, and thereby, generates a drive signal (PWM signal) to the motor drive circuit 41B.

The motor drive circuit 41B is a PWM inverter in which three legs respectively corresponding to three phases (U, V, and W) are connected in parallel. Each leg is a basic unit constituted by a switching element such as two filed effect transistors (FET) connected in series. In the motor drive circuit 41B, the switching elements in the respective phases perform switching based on the drive signal that is generated by the first reaction force control circuit 41A, and thereby, direct-current power that is supplied from a battery is converted into three-phase alternating-current power. The three-phase alternating-current power that is generated by the motor drive circuit 41B is supplied to the winding group N11 of the first system of the reaction force motor 21, through electricity supply paths in the respective phases, as exemplified by bus bars or cables. Thereby, the winding group N11 of the first system generates a torque depending on the first current command value.

The second reaction force control circuit 42A basically has the same configuration as the first reaction force control circuit 41A. The second reaction force control circuit 42A calculates the target steering reaction force that needs to be generated by the reaction force motor 21, based on the steering torque Th that is detected through the torque sensor 23. The second reaction force control circuit 42A calculates the second current command value to the winding group N12 of the second system, depending on the calculated value of the target steering reaction force. The second current command value is set to half (50%) of a current amount that is necessary for the reaction force motor 21 to generate the target steering reaction force. The second reaction force control circuit 42A executes such a current feedback control that the actual value of the electric current that is supplied to the winding group N12 of the second system follows the second current command value, and thereby, generates a drive signal to the motor drive circuit 42B.

The motor drive circuit 42B basically has the same configuration as the motor drive circuit 41B. The motor drive circuit 42B converts direct-current power that is supplied from the battery, into three-phase alternating-current power, based on the drive signal that is generated by the second reaction force control circuit 42A. The three-phase alternating-current power that is generated by the motor drive circuit 42B is supplied to the winding group N12 of the second system of the reaction force motor 21, through electricity supply paths in the respective phases, as exemplified by bus bars or cables. Thereby, the winding group N12 of the second system generates a torque depending on the second current command value. The reaction force motor 21 generates the total torque of the torque that is generated by the winding group N11 of the first system and the torque that is generated by the winding group N12 of the second system.

Depending on the product specification, the first system circuit 41 and second system circuit 42 of the reaction force control device 40 may have a master-slave relationship. In this case, for example, the first system circuit 41 may function as a master, and the second system circuit 42 may function as a slave. Further, depending on the product specification, the first system circuit 41 and the second system circuit 42 may have a fifty-fifty relationship.

Turning Control Device

Next, the configuration of the turning control device 50 will be described in detail. As shown in FIG. 2, the turning control device 50 includes the first system circuit 51 and the second system circuit 52. The first system circuit 51 includes a first turning control circuit 51A and a motor drive circuit 51B. The second system circuit 52 includes a second turning control circuit 52A and a motor drive circuit 52B.

The first turning control circuit 51A basically has the same configuration as the first reaction force control circuit 41A. The first turning control circuit 51A calculates the target turning angle of the turning wheel 15, based on the steering angle θs that is detected through the rudder angle sensor 24. The first turning control circuit 51A calculates the turning angle θw based on the stroke Xw of the turning shaft 13 that is detected through the stroke sensor 34. The first turning control circuit 51A calculates the target turning force that needs to be generated by the turning motor 31, through the execution of such an angle feedback control that the turning angle θw that is calculated based on the stroke Xw follows the target turning angle. The first turning control circuit 51A calculates a third current command value to the winding group N21 of the first system of the turning motor 31, depending on the value of the target turning force. The third current command value is set to half (50%) of a current amount that is necessary for the turning motor 31 to generate the target turning force. The first turning control circuit 51A executes such a current feedback control that the actual value of the electric current that is supplied to the winding group N21 of the first system follows the third current command value, and thereby, generates a drive signal to the motor drive circuit 51B.

The motor drive circuit 51B basically has the same configuration as the motor drive circuit 41B. The motor drive circuit 51B converts direct-current power that is supplied from the battery, into three-phase alternating-current power, based on the drive signal that is generated by the first turning control circuit 51A. The three-phase alternating-current power that is generated by the motor drive circuit 51B is supplied to the winding group N21 of the first system of the turning motor 31, through electricity supply paths in the respective phases, as exemplified by bus bars or cables. Thereby, the winding group N21 of the first system generates a torque depending on the third current command value.

The second turning control circuit 52A basically has the same configuration as the first reaction force control circuit 41A. The second turning control circuit 52A calculates the target turning angle of the turning wheel 15, based on the steering angle θs that is detected through the rudder angle sensor 24. The second turning control circuit 52A calculates the turning angle θw based on the stroke Xw of the turning shaft 13 that is detected through the stroke sensor 34. The second turning control circuit 52A calculates the target turning force that needs to be generated by the turning motor 31, through the execution of such an angle feedback control that the turning angle θw that is calculated based on the stroke Xw follows the target turning angle. The second turning control circuit 52A calculates a fourth current command value to the winding group N22 of the second system of the turning motor 31, depending on the value of the target turning force. The fourth current command value is set to half (50%) of a current amount that is necessary for the turning motor 31 to generate the target turning force. The second turning control circuit 52A executes such a current feedback control that the actual value of the electric current that is supplied to the winding group N22 of the second system follows the fourth current command value, and thereby, generates a drive signal to the motor drive circuit 52B.

The motor drive circuit 52B basically has the same configuration as the motor drive circuit 41B. The motor drive circuit 52B converts direct-current power that is supplied from the battery, into three-phase alternating-current power, based on the drive signal that is generated by the second turning control circuit 52A. The three-phase alternating-current power that is generated by the motor drive circuit 52B is supplied to the winding group N22 of the second system of the turning motor 31, through electricity supply paths in the respective phases, as exemplified by bus bars or cables. Thereby, the winding group N22 of the second system generates a torque depending on the fourth current command value. The turning motor 31 generates the total torque of the torque that is generated by the winding group N21 of the first system and the torque that is generated by the winding group N22 of the second system.

Depending on the product specification, the first system circuit 51 and second system circuit 52 of the turning control device 50 may have a master-slave relationship. In this case, for example, the first system circuit 51 may function as a master, and the second system circuit 52 may function as a slave. Further, depending on the product specification, the first system circuit 51 and the second system circuit 52 may have a fifty-fifty relationship.

Communication Path

Next, communication paths within the reaction force control device 40 and the turning control device 50 and communication paths between the reaction force control device 40 and the turning control device 50 will be described.

As shown in FIG. 2, the first reaction force control circuit 41A and the second reaction force control circuit 42A exchange information with each other through a communication line L1. The information includes abnormality information about the first reaction force control circuit 41A, the second reaction force control circuit 42A, or the motor drive circuits 41B, 42B. Further, the information includes the values of flags that indicate various states. The first reaction force control circuit 41A and the second reaction force control circuit 42A control the driving of the reaction force motor 21 in a coordinated manner, based on the information that is mutually exchanged.

The first turning control circuit 51A and the second turning control circuit 52A exchange information with each other through a communication line L2. The information includes abnormality information about the first turning control circuit 51A, the second turning control circuit 52A, or the motor drive circuits 51B, 52B. Further, the information includes the values of flags that indicate various states. The first turning control circuit 51A and the second turning control circuit 52A control the driving of the turning motor 31 in a coordinated manner, based on the information that is mutually exchanged.

The first reaction force control circuit 41A and the first turning control circuit 51A exchange information with each other through a communication line L3. The information includes abnormality information about the first reaction force control circuit 41A, the first turning control circuit 51A, and the motor drive circuits 41B, 51B. Further, the information includes the values of flags that indicate various states. The first reaction force control circuit 41A and the first turning control circuit 51A operate in cooperation, based on the information that is mutually exchanged.

The second reaction force control circuit 42A and the second turning control circuit 52A exchange information with each other through a communication line L4. The information includes abnormality information about the second reaction force control circuit 42A, the second turning control circuit 52A, or the motor drive circuits 42B, 52B. Further, the information includes the values of flags that indicate various states. The second reaction force control circuit 42A and the second turning control circuit 52A operate in cooperation, based on the information that is mutually exchanged.

Comparative Example of Starting Sequences

Next, a comparative example of starting sequences of the reaction force control device 40 and the vehicle control device 60 will be described. Each starting sequence is a sequence of processes that is executed at the time when a vehicle electric power source has been turned on. During a period when the vehicle electric power source is in the off-state, the reaction force control device 40 and the vehicle control device 60 are maintained in a state where the operation is stopped. The turning-on or turning-off of the vehicle electric power source is, for example, the turning-on or turning-off of a starting switch provided at a driver's seat. The starting switch is operated for starting up or stopping the traveling drive source of the vehicle, and is an ignition switch or a power switch, for example.

First, a comparative example of the starting sequence of the vehicle control device 60 will be described. As shown in a time chart of FIG. 3, when the vehicle electric power source has been turned on (time T1), the vehicle control device 60 starts the execution of a preset starting preparation. The starting preparation includes an initial check of the vehicle control device 60 and processes that are necessary to start up the powertrain of the vehicle. After the completion of the starting preparation, the vehicle control device 60 starts up the powertrain (mainly the traveling drive source). When the execution of the start-up process for the powertrain has been completed, the vehicle control device 60 turns on a preparation completion signal S1 (time T2). The vehicle control device 60 turns on the preparation completion signal S1 regardless of the state of the reaction force control device 40.

The preparation completion signal S1 is information indicating whether the traveling preparation for the vehicle that includes the start-up process for the powertrain has been completed and the vehicle has become the state of being capable of traveling. The on-state of the preparation completion signal S1 indicates that the vehicle is in the state of being capable of traveling. The off-state of the preparation completion signal S1 indicates that the vehicle is not in the state of being capable of traveling. The preparation completion signal S1 is transmitted to the reaction force control device 40 as an electric signal.

Next, a comparative example of the starting sequence of the reaction force control device 40 will be described. As shown in the time chart of FIG. 3, when the vehicle electric power source has been turned on (time T1), the reaction force control device 40 starts, sequentially executes an initial check, a middle-point learning process, and a rudder angle synchronization process, and then transitions to an assist start waiting state. The initial check, the middle-point learning process, and the rudder angle synchronization process constitute a sequence of preparation processes that is necessary to start the execution of the reaction force control to cause the reaction force motor 21 to generate the steering reaction force.

The initial check is an initial examination that is executed at the time when the vehicle electric power source has been turned on, and for example, includes the check of hardware, the initialization of a central processing unit (CPU), and the initialization of variables, flags, or the like.

The middle-point learning process is a process for learning a steering neutral position of the steering wheel 11. The steering device 10 includes a stopper mechanism that restricts the rotation of the steering wheel 11 for providing the limit of the steering angle θs of the steering wheel 11. For example, the stopper mechanism restricts the steering range of the steering wheel 11 to less than 360°. The reaction force control device 40 causes the steering wheel 11 to operate to a first operation end and thereafter causes the steering wheel 11 to reversely operate to a second operation end, through the control of the reaction force motor 21. Thereafter, the reaction force control device 40 calculates the middle point of the steering angle θs, based on the rotational angles of the reaction force motor 21 at the start time point and end time point of the reverse operation of the steering wheel 11. The middle point of the steering angle θs corresponds to a motor middle-point that is the rotational position of the reaction force motor 21 when the steering wheel 11 is at the steering neutral position. The reaction force control device 40 stores the middle point of the steering angle θs or the motor middle-point, as the steering neutral position of the steering wheel 11.

The reaction force control device 40 learns the steering neutral position of the steering wheel 11, when the vehicle electric power source has been turned on for the first time after the attachment of a new battery. This is because the information relevant to the steering neutral position stored in the reaction force control device 40 is lost due to the stop of electric power to the reaction force control device 40 when the battery is detached from the vehicle for battery replacement work, for example.

The rudder angle synchronization process is a process of correcting the rotational position of the steering wheel 11. When the rotational position of the steering wheel 11 is different from the rotational position corresponding to the turning position of the turning wheel 15, the reaction force control device 40 drives the reaction force motor 21 such that the rotational position of the steering wheel 11 becomes the rotational position corresponding to the turning position of the turning wheel 15.

The assist start waiting state is a state of waiting for the confirmation of the completion of the execution of the start-up process for the powertrain by the vehicle control device 60 after the completion of the execution of the preparation process. The reaction force control device 40 determines whether to transition from the assist start waiting state to an ordinary control state, depending on the start-up state of the powertrain of the vehicle. When the preparation completion signal S1 has not been turned on by the vehicle control device 60, the reaction force control device 40 determines that the execution of the start-up process of the powertrain of the vehicle has not been completed, and maintains the assist start waiting state. When the preparation completion signal S1 has been turned on by the vehicle control device 60, the reaction force control device 40 determines that the execution of the start-up process of the powertrain of the vehicle has been completed (time T3), and transitions from the assist start waiting state to the ordinary control state. The ordinary control state is a state of executing the reaction force control to cause the reaction force motor 21 to generate the steering reaction force. In the ordinary control state, the reaction force control device 40 controls the driving of the reaction force motor 21 depending on the steering state of the steering wheel 11.

Figure 3:
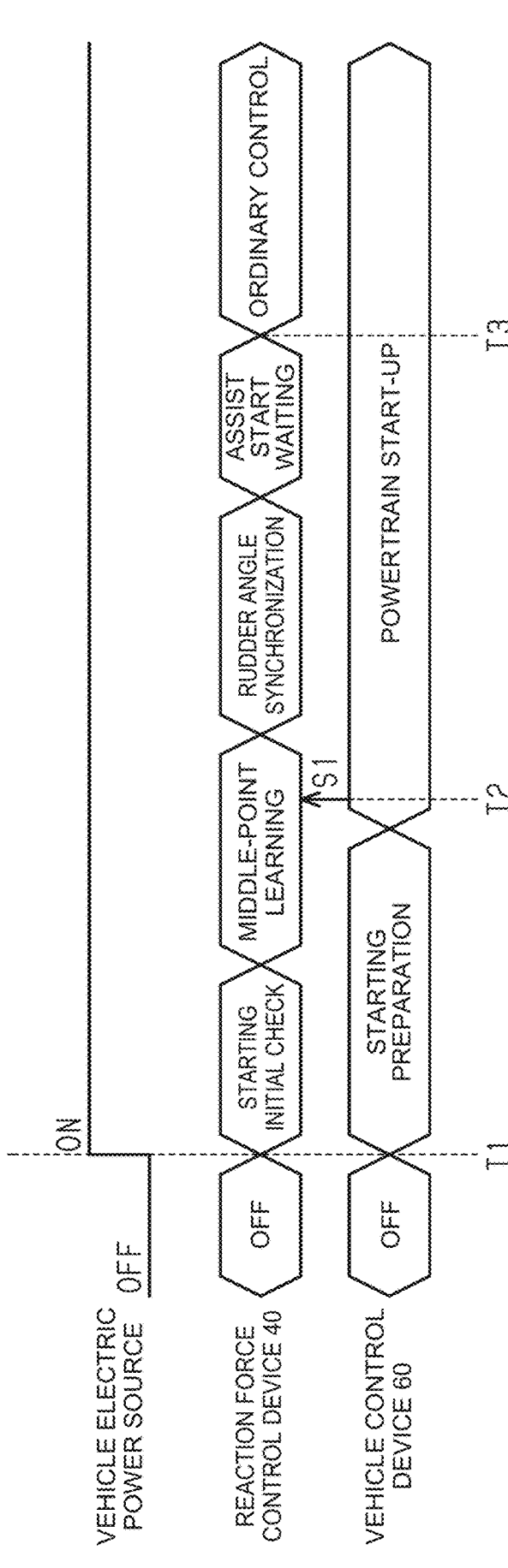
FIG. 3 is a time chart showing a comparative example of starting sequences in the reaction force control device and a vehicle control device.

In the time chart of FIG. 3, as an example, the vehicle control device 60 turns on the preparation completion signal S1 during the execution of the middle-point learning process. In the case where the vehicle becomes the state of being capable of traveling regardless of the state of the reaction force control device 40, the vehicle can travel even though the reaction force control device 40 is executing the preparation process. In this case, there is concern as follows.

For example, in the case where the traveling of the vehicle is started even though the reaction force control device 40 is executing the middle-point learning process, there is a risk that it is difficult for the driver to operate the steering wheel 11 in an intended steering direction. This is because the steering wheel 11 automatically rotates during the execution of the middle-point learning process.

Further, also in the case where the traveling of the vehicle is started even though the reaction force control device 40 is executing the rudder angle synchronization process, there is a risk that it is difficult for the driver to operate the steering wheel 11 in an intended steering direction. This is because the steering wheel 11 automatically rotates during the execution of the rudder angle synchronization process. In addition, this is because the rotational position of the steering wheel 11 is different from the proper rotational position corresponding to the turning position of the turning wheel 15 during the execution of the rudder angle synchronization process. Hence, the reaction force control device 40 is configured to execute the following process.

Start-Up Permission Determination Process

The reaction force control device 40 executes a start-up permission determination process at the time when the vehicle electric power source has been turned on. The start-up permission determination process is a process of determining whether to permit the vehicle control device 60 to start up the powertrain. The start-up permission determination process is executed with a predetermined control period, in accordance with a program stored in the reaction force control device 40.

Figure 4:
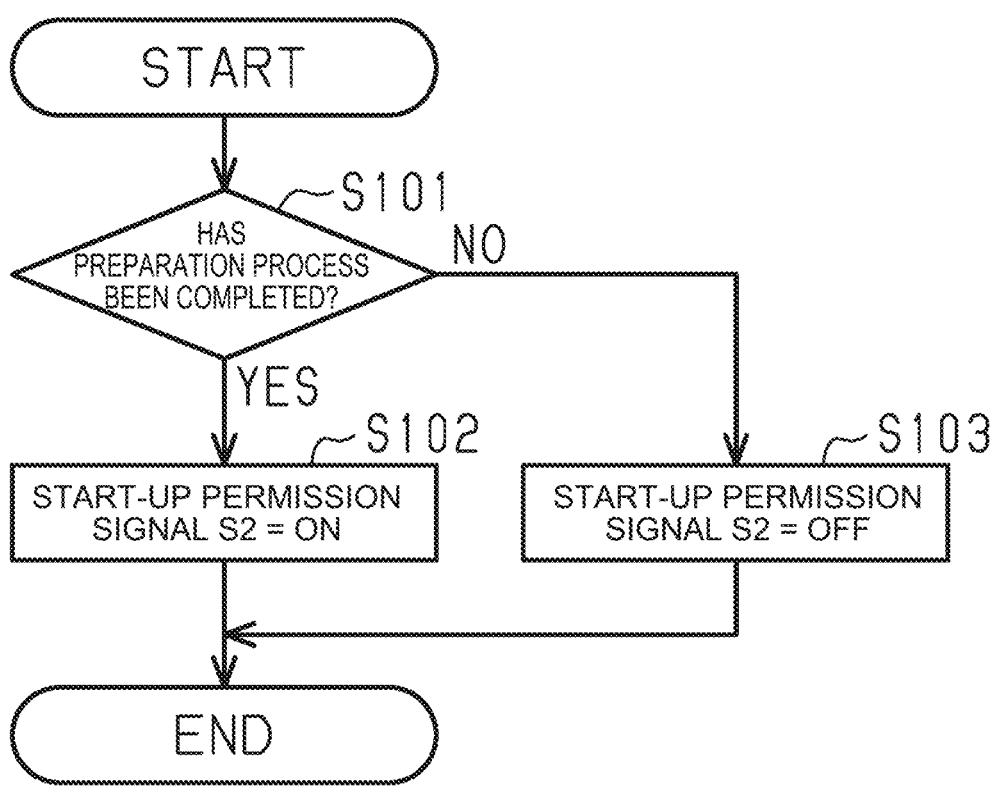
FIG. 4 is a flowchart showing a processing procedure of a start-up permission determination for a powertrain of a vehicle by the reaction force control device in the embodiment.

As shown in a flowchart of FIG. 4, the reaction force control device 40 determines whether the preparation process for the reaction force control has been completed (step S101). The preparation process is a process for the preparation that is necessary to start the execution of the reaction force control, and includes the initial check, the middle-point learning process, and the rudder angle synchronization process.

When it is determined that the preparation process has been completed (YES in step S101), the reaction force control device 40 turns on a start-up permission signal S2

(step S102), and ends the process. When it is determined that the preparation process has not been completed (NO in step S101), the reaction force control device 40 turns off the start-up permission signal S2 (step S103), and ends the process.

The start-up permission signal S2 is information indicating whether the vehicle control device 60 is permitted to start up the powertrain. The on-state of the start-up permission signal S2 indicates that the vehicle control device 60 is permitted to start up the powertrain. The off-state of the start-up permission signal S2 indicates that the vehicle control device 60 is not permitted to start up the powertrain. The start-up permission signal S2 is transmitted to the vehicle control device 60 as an electric signal.

First Pattern of Starting Sequences

Figure 5:
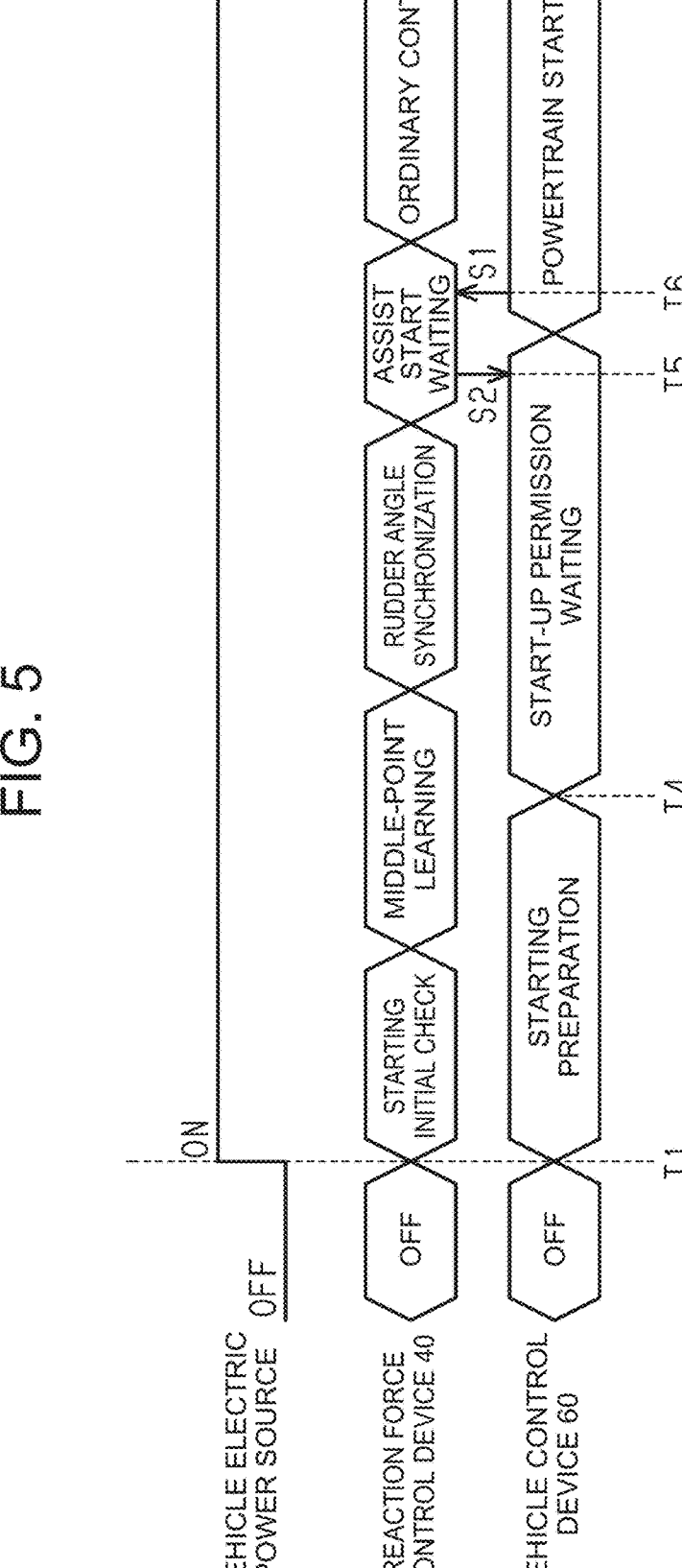
FIG. 5 is a time chart showing a first pattern of the starting sequences in the reaction force control device and the vehicle control device in the embodiment.

Next, a first pattern of the starting sequences will be described. As shown in a time chart of FIG. 5, when the vehicle electric power source has been turned on (time T1), the reaction force control device 40 starts, and sequentially executes the initial check, the middle-point learning process, and the rudder angle synchronization process. After the completion of the preparation process including the initial check, the middle-point learning process, and the rudder angle synchronization process, the reaction force control device 40 transitions to the assist start waiting state, and turns on the start-up permission signal S2. The assist start waiting state is a state of being capable of transitioning to the ordinary control state after the preparation of the reaction force control.

When the vehicle electric power source has been turned on (time T1), the vehicle control device 60 starts the execution of the preset starting preparation. After the completion of the starting preparation, the vehicle control device 60 transitions to a start-up permission waiting state (time T4). The start-up permission waiting state is a state of waiting for the permission of the start of the powertrain by the reaction force control device 40, that is, the turning-on of the start-up permission signal S2.

When it is recognized in the start-up permission waiting state that the start-up permission signal S2 has been turned on (time T5), the vehicle control device 60 starts up the powertrain of the vehicle. When the execution of the start-up process for the powertrain has been completed, the vehicle control device 60 turns on the preparation completion signal S1.

When it is recognized in the assist start waiting state that the preparation completion signal S1 has been turned on (time T6), the reaction force control device 40 transitions to the ordinary control state. The reaction force control device 40 controls the driving of the reaction force motor 21 depending on the steering state of the steering wheel 11.

In this way, in the case where the starting preparation for the vehicle control device 60 has been completed and where the preparation process for the reaction force control by the reaction force control device 40 has not been completed, the vehicle control device 60 waits for the completion of the preparation process, and then starts up the powertrain of the vehicle. Therefore, the vehicle can travel only after the reaction force control device 40 has transitioned to the assist start waiting state, which is the state of being capable of executing the reaction force control. Accordingly, the vehicle is avoided from becoming the state of being capable of traveling even though the reaction force control device 40 is executing the preparation process. Further, the traveling of the vehicle can be started in a safer state for the driver, that is, in a state where the vehicle can be turned in a direction that is intended by the driver.

Measure Against Spoofing

In the first pattern of the starting sequences, there is concern as follows. That is, there is concern that the turning-on of the start-up permission signal S2 by the reaction force control device 40 or the turning-on of the preparation completion signal S1 by the vehicle control device 60 may be faked by a third party that spoofs the reaction force control device 40 or the vehicle control device 60. In this case, there is a risk that the vehicle transitions to the state of being capable of traveling before the reaction force control device 40 transitions to the assist start waiting state, which is the state of being capable of executing the reaction force control. Hence, the reaction force control device 40 is configured to execute the following process.

Stop Request Determination Process to Vehicle

The reaction force control device 40 executes a stop request determination process to the vehicle, at the time when the vehicle electric power source has been turned on. The stop request determination process is a process of determining whether it is necessary to request the vehicle control device 60 to stop the start-up of the powertrain of the vehicle. The stop request determination process is executed with a predetermined control period, in accordance with a program stored in the reaction force control device 40.

Figure 6:
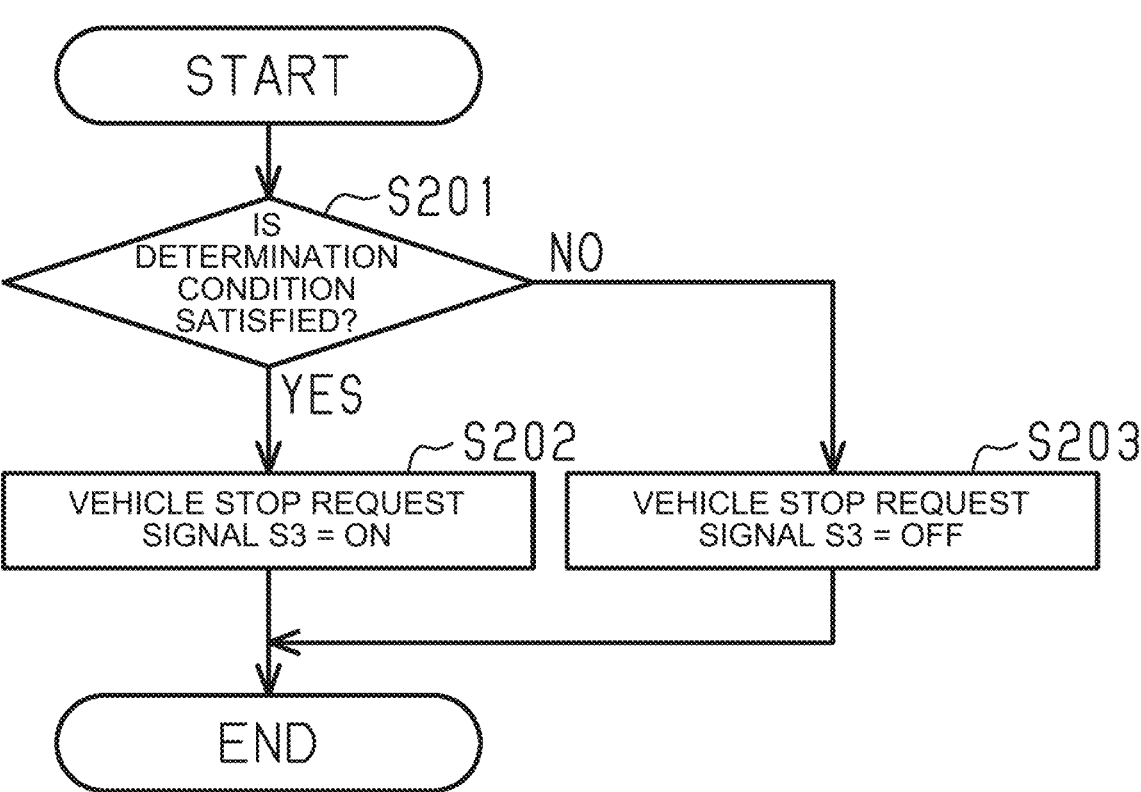
FIG. 6 is a flowchart showing a processing procedure of a vehicle stop request determination by the reaction force control device in the embodiment.

As shown in a flowchart of FIG. 6, the reaction force control device 40 determines whether it is necessary to request the vehicle control device 60 to stop the start-up of the powertrain of the vehicle (step S201).

The reaction force control device 40 determines whether it is necessary to request the vehicle control device 60 to stop the start-up of the powertrain of the vehicle, based on whether a preset determination condition is satisfied. The determination condition is a condition for determining whether the turning-on of the start-up permission signal S2 by the reaction force control device 40 or the turning-on of the preparation completion signal S1 by the vehicle control device 60 has been faked.

For example, the determination condition includes the following two conditions A1 and A2. When both of the two conditions A1 and A2 are satisfied, the reaction force control device 40 determines that it is necessary to request the vehicle control device 60 to stop the start-up of the powertrain of the vehicle. Further, when one of the two conditions A1 and A2 is not satisfied, the reaction force control device 40 determines that it is not necessary to request the vehicle control device 60 to stop the start-up of the powertrain of the vehicle.

The condition A1 is a condition that the start-up permission signal S2 has been turned off. The condition A2 is a condition that the preparation completion signal S1 has been turned on. The determination condition is set based on the following standpoint. For example, in the case where the preparation completion signal S1 has been turned on by the vehicle control device 60 even though the start-up permission signal S2 has not been turned on by the reaction force control device 40, there is a risk that the turning-on of the start-up permission signal S2 has been faked by the third party that spoofs the reaction force control device 40.

When it is determined that it is necessary to request the vehicle control device 60 to stop the start-up of the powertrain of the vehicle (YES in step S201), the reaction force control device 40 turns on a vehicle stop request signal S3 (step S202), and ends the process.

When it is determined that it is not necessary to request the vehicle control device 60 to stop the start-up of the powertrain of the vehicle (NO in step S201), the reaction force control device 40 turns off the vehicle stop request signal S3 (step S203), and ends the process.

The vehicle stop request signal S3 is information indicating whether the vehicle control device 60 is requested to stop the operation of the powertrain. The on-state of the vehicle stop request signal S3 indicates that the vehicle control device 60 is requested to stop the operation of the powertrain. The off-state of the vehicle stop request signal S3 indicates that the vehicle control device 60 is not requested to stop the operation of the powertrain. The vehicle stop request signal S3 is transmitted to the vehicle control device 60 as an electric signal.

Second Pattern of Starting Sequences

Next, a second pattern of the starting sequences will be described. As an example, suppose that the turning-on of the start-up permission signal S2 has been faked in the middle of the execution of the middle-point learning process, which is one process of the preparation process by the reaction force control device 40. Further, the starting preparation for the vehicle control device 60 is completed before the middle-point learning process by the reaction force control device 40 is completed.

Figure 7:
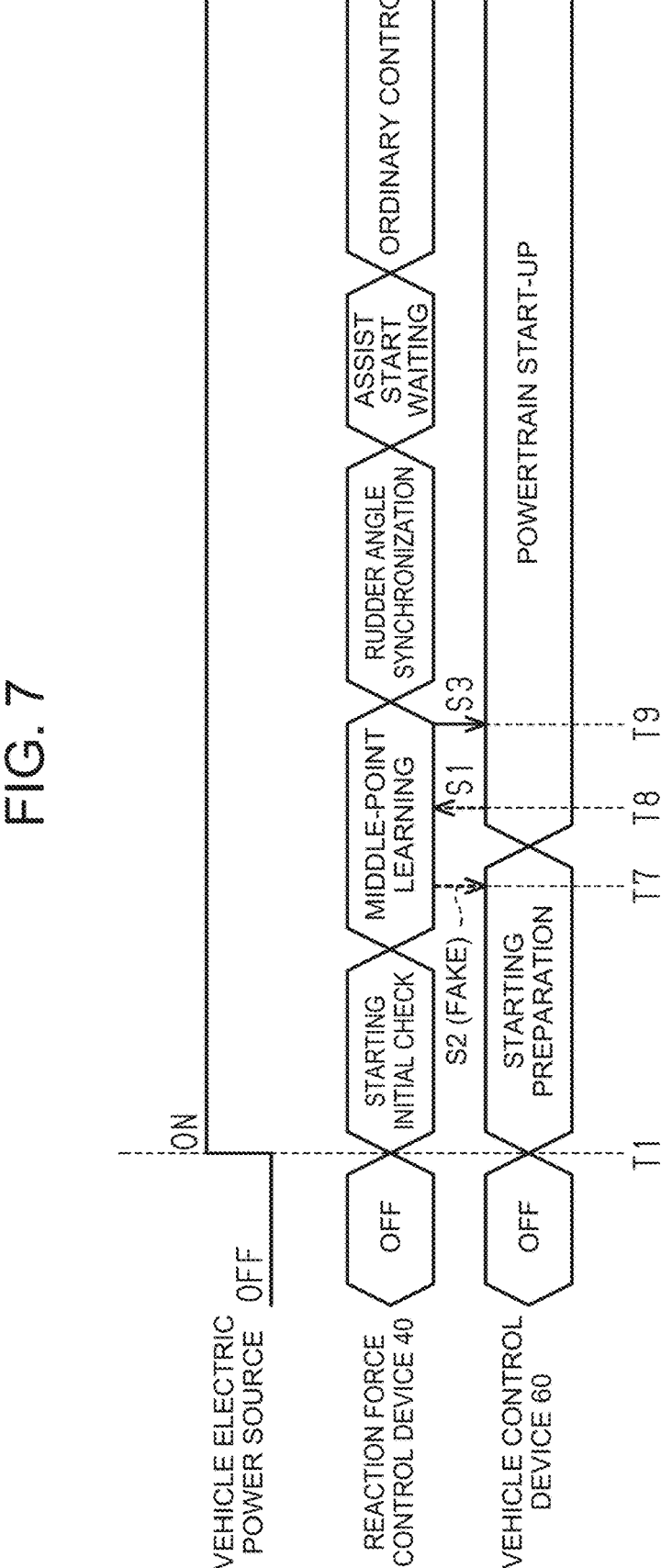
FIG. 7 is a time chart showing a second pattern of the starting sequences in the reaction force control device and the vehicle control device in the embodiment.

As shown in a time chart of FIG. 7, when the vehicle electric power source has been turned on (time T1), the reaction force control device 40 starts, and starts the execution of the initial check. After the initial check has been normally completed, the reaction force control device 40 starts the execution of the middle-point learning process. For example, in the case where the turning-on of the start-up permission signal S2 has been faked in the middle of the execution of the middle-point learning process (time T7), the vehicle control device 60 recognizes that the start-up permission signal S2 has already been turned on, for example, at the timing of the completion of the starting preparation. Therefore, after the completion of the starting preparation, the vehicle control device 60 immediately starts up the powertrain of the vehicle, without transitioning to the start-up permission waiting state. When the execution of the start-up process for the powertrain has been completed, the vehicle control device 60 turns on the preparation completion signal S1 (time T8).

When it is recognized that the preparation completion signal S1 has been turned on even though the middle-point learning process is being executed, the reaction force control device 40 turns on the vehicle stop request signal S3 (time T9). This is because the turning-on of the start-up permission signal S2 has been faked by the third party that spoofs the reaction force control device 40.

When it is recognized that the vehicle stop request signal S3 has been turned on after the powertrain of the vehicle has been started up, the vehicle control device 60 executes a preset process. For example, the preset process is a process for stopping the operation of the powertrain. Thereby, the vehicle cannot travel. Further, the vehicle is restrained from being maintained in the state of being capable of traveling by malfeasance such as spoofing, even though the reaction force control device 40 is executing the preparation process.

Remote Function

In the case where the stop request determination process to the vehicle is executed, there is concern as follows. The vehicle sometimes has a remote function. For example, the remote function is a function to remotely operate an electronic apparatus equipped in the vehicle using wireless communication when the vehicle is in a parked state. A user of the vehicle can remotely operate functions of the vehicle, for example, through the operation of a portable terminal that is possessed by the user. For example, the remote function is a remote air-conditioner function. The remote air-conditioner function allows an air conditioner to be actuated before the user gets in the vehicle, through the remote operation with the portable terminal. The air conditioner is an electronic apparatus equipped in the vehicle.

When the remote function of the vehicle is turned on through the operation of the portable terminal, that is, when a remote operation signal from the portable terminal is received, the vehicle control device 60 turns on the vehicle electric power source, and starts the execution of the starting preparation. After the completion of the starting preparation, the vehicle control device 60 starts up the powertrain, without the permission by the reaction force control device 40. When the execution of the start-up process for the powertrain has been completed, the vehicle control device 60 actuates the air conditioner. Thereby, the temperature in a vehicle cabin is adjusted to an appropriate temperature, before the user gets in the vehicle. Further, when the execution of the start-up process for the powertrain has been completed, the vehicle control device 60 turns on the preparation completion signal S1 regardless of the state of the reaction force control device 40. That is, the vehicle control device 60 turns on the preparation completion signal S1, even when the start-up permission signal S2 is in the off-state.

Therefore, there is a risk that the vehicle control device 60 turns on the preparation completion signal S1 before the preparation process for the reaction force control device 40 is completed, that is, before the reaction force control device 40 turns on the start-up permission signal S2. In this case, even though the start-up permission signal S2 has not been turned on, the reaction force control device 40 turns on the vehicle stop request signal S3 because the vehicle control device 60 turns on the preparation completion signal S1. When it is recognized that the vehicle stop request signal S3 has been turned on, the vehicle control device 60 executes the process for stopping the operation of the powertrain. Accordingly, there is concern that the traveling of the vehicle is prohibited even though the remote function has been turned on by the authorized user of the vehicle.

Hence, the reaction force control device 40 is configured to execute a first stop request determination process or a second stop request determination process, as the stop request determination process to the vehicle. The first stop request determination process and the second stop request determination process are different in determination condition. The determination condition is a condition for determining whether it is necessary for the reaction force control device 40 to request the stop of the powertrain of the vehicle. Which of the first stop request determination process and the second stop request determination process is employed is decided based on the product specification and the like.

First Stop Request Determination Process

First, the first stop request determination process will be described. The first stop request determination process is basically executed in accordance with the above flowchart of FIG. 6. However, the determination condition that is used in step S201 includes the following condition A3, in addition to the above two conditions A1 and A2.

The condition A3 is a condition that the shift range of the vehicle is a shift range that allows the traveling. For example, the shift range includes a parking range, a reverse range, a neutral range, and a drive range. The parking range is a shift range when the vehicle is parked. The neutral range is a shift range in which the dynamic power transmission between the traveling drive source and drive wheel of the vehicle is blocked. The reverse range is a shift range when the vehicle is moved backward. The drive range is a shift range when the vehicle is moved forward. Each of the parking range and the neutral range is a shift range in which the vehicle cannot travel by the dynamic power of the traveling drive source. Each of the reverse range and the drive range is a shift range in which the vehicle can travel by the dynamic power of the traveling drive source.

The determination condition is set such that the turning-on of the preparation completion signal S1 due to the turning-on of the remote function of the vehicle is allowed with the securement of the function to stop the traveling of the vehicle in the case where the preparation completion signal S1 is turned on before the preparation process for the reaction force control device 40 is completed.

The reaction force control device 40 executes the first stop request determination process in accordance with the above flowchart of FIG. 6. In step S201, the reaction force control device 40 determines whether it is necessary to stop the start-up of the powertrain of the vehicle. When all of the three conditions A1, A2 and A3 are satisfied, the reaction force control device 40 determines that it is necessary to request the vehicle control device 60 to stop the powertrain. When at least one of the three conditions A1, A2 and A3 is not satisfied, the reaction force control device 40 determines that it is not necessary to request the vehicle control device 60 to stop the powertrain.

Third Pattern of Starting Sequences

Next, a third pattern of the starting sequences will be described. The vehicle electric power source has been turned off. The shift range is the parking range.

Figure 8:
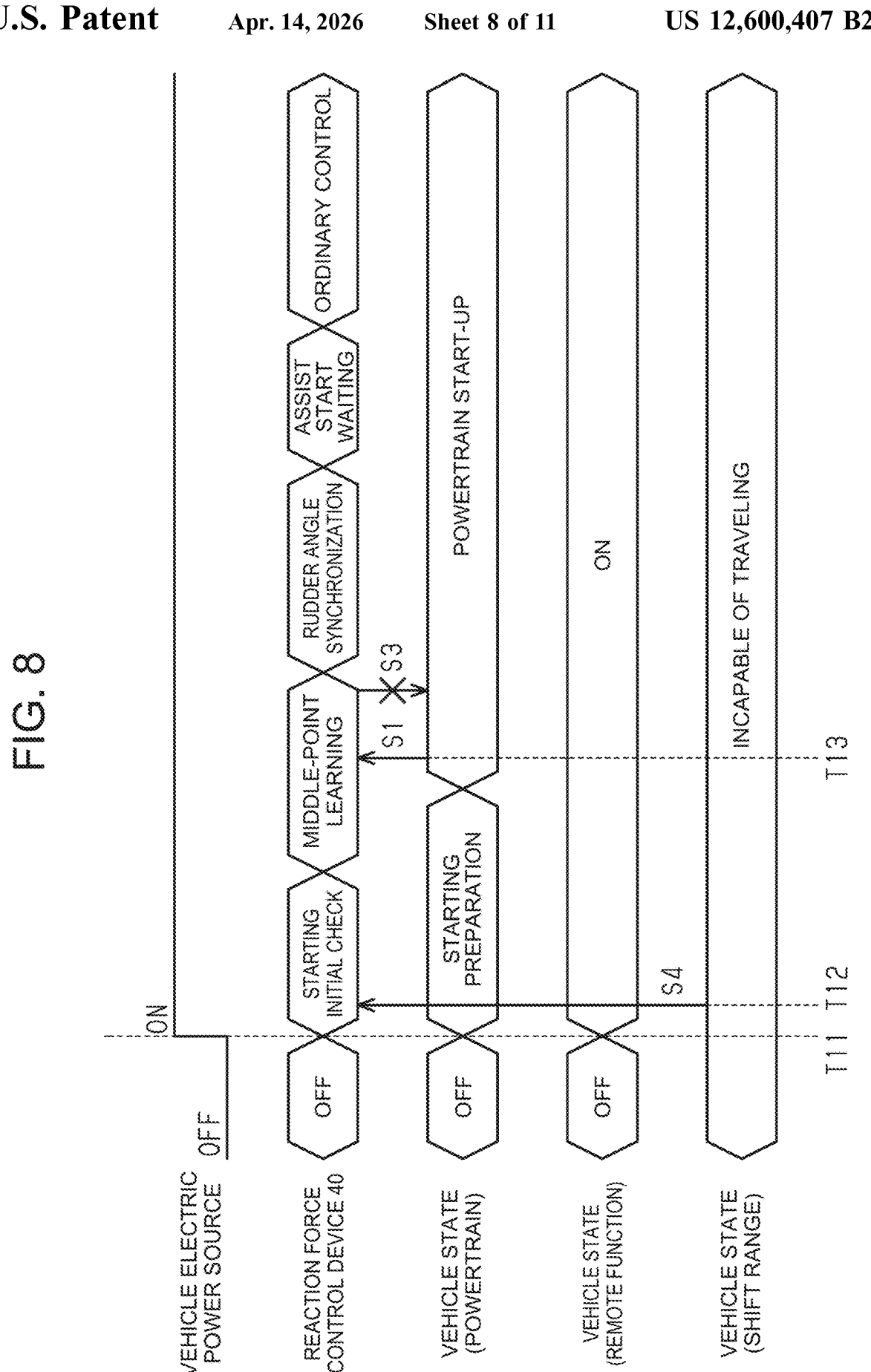
FIG. 8 is a time chart showing a third pattern of the starting sequences in the reaction force control device and the vehicle control device in the embodiment.

As shown in a time chart of FIG. 8, when the remote function of the vehicle has been turned on through the operation of the portable terminal (time T11), the vehicle control device 60 turns on the vehicle electric power source. When the vehicle electric power source has been turned on, the reaction force control device 40 starts, and sequentially executes the initial check, the middle-point learning process, and the rudder angle synchronization process. After the starting, the reaction force control device 40 acquires a shift range signal S4 from the vehicle control device 60 (T12). The shift range signal S4 is an electric signal indicating the current shift range.

When the vehicle electric power source has been turned on, the vehicle control device 60 starts the execution of the starting preparation for the powertrain. After the completion of the starting preparation, the vehicle control device 60 starts up the powertrain, and turns on the preparation completion signal S1 (T13). In the example of FIG. 8, for example, the preparation completion signal S1 is turned on during the execution of the middle-point learning process for the reaction force control device 40. The turning-on of the preparation completion signal S1 is due to the turning-on of the remote function.

Based on the shift range signal S4, the reaction force control device 40 recognizes that the shift range is the parking position, that is, the vehicle cannot travel. Since the condition A3 of the above three conditions A1, A2 and A3 is not satisfied, the reaction force control device 40 determines that it is not necessary to stop the powertrain. The reaction force control device 40 maintains the vehicle stop request signal S3 in the off-state, even when the preparation completion signal S1 has been turned on in the middle of the execution of the middle-point learning process. This is, for example, because the vehicle cannot travel and therefore safety is secured even before the completion of the preparation process for the reaction force control device 40.

Since the vehicle stop request signal S3 has not been turned on, the powertrain is maintained in the start-up state. Accordingly, the traveling of the vehicle is restrained from being prohibited even though the remote function has been turned on by the authorized user of the vehicle. For example, in the case where the remote function is the remote air-conditioner function, the user can get in the vehicle in which the temperature in the vehicle cabin has been adjusted to an appropriate temperature, to cause the vehicle to travel.

Fourth Pattern of Starting Sequences

Next, a fourth pattern of the starting sequences will be described. The electric power source of the vehicle has been turned off. The shift range is the parking range. The remote function has been turned off.

Figure 9:
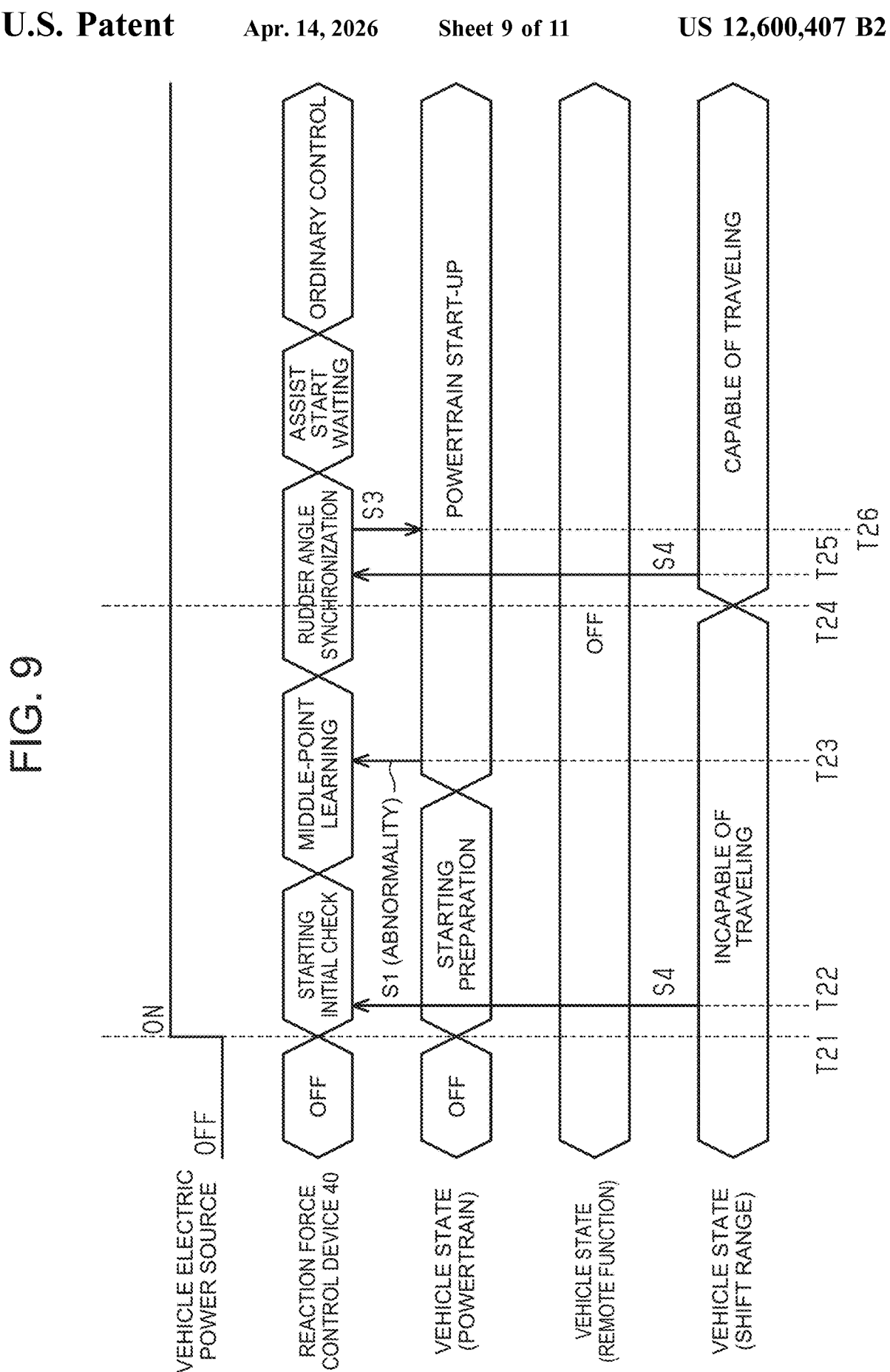
FIG. 9 is a time chart showing a fourth pattern of the starting sequences in the reaction force control device and the vehicle control device in the embodiment.

As shown in a time chart of FIG. 9, when the vehicle electric power source has been turned on (time T21), the reaction force control device 40 starts, and sequentially executes the initial check, the middle-point learning process, and the rudder angle synchronization process. After the starting, the reaction force control device 40 acquires the shift range signal S4 from the vehicle control device 60 (time T22). The shift range signal S4 is an electric signal indicating the current shift range.

For example, when the preparation completion signal S1 has been turned on in the middle of the execution of the middle-point learning process (time T23), the reaction force control device 40 maintains the vehicle stop request signal S3 in the off-state. However, the preparation completion signal S1 is not an ordinary preparation completion signal S1 that responds to the start-up permission signal S2 turned on by the reaction force control device 40. The preparation completion signal S1 is, for example, an abnormal preparation completion signal S1 due to spoofing, or an abnormal preparation completion signal S1 turned on by the vehicle control device 60 at an improper timing.

Based on the shift range signal S4, the reaction force control device 40 recognizes that the shift range is the parking position, that is, the vehicle cannot travel. Since the condition A3 of the above three conditions A1, A2 and A3 is not satisfied, the reaction force control device 40 determines that it is not necessary to stop the powertrain. Therefore, the reaction force control device 40 maintains the vehicle stop request signal S3 in the off-state, even when the preparation completion signal S1 has been turned on in the middle of the execution of the middle-point learning process. This is based on the following standpoint. Since the vehicle cannot travel, safety is secured even when the powertrain is started up before the preparation process for the reaction force control device 40 is completed. Further, since the vehicle cannot travel, there is a low probability of the occurrence of theft or the like.

After the completion of the execution of the middle-point learning process, the reaction force control device 40 starts the execution of the rudder angle synchronization process. For example, when the shift range has been switched to the reverse range or the drive range in the middle of the execution of the rudder angle synchronization process (time T24), the reaction force control device 40 executes the following process. The reaction force control device 40 acquires the shift range signal S4 from the vehicle control device 60 (time T25), and recognizes that the shift range is a shift range that allows the vehicle to travel, based on the acquired shift range signal S4. Since all of the above three conditions A1, A2 and A3 are satisfied, the reaction force control device 40 determines that it is necessary to stop the powertrain, and turns on the vehicle stop request signal S3 (T26). This is based on the following standpoint. Since the vehicle can travel, it is not desirable for the vehicle to become the state of being capable of traveling before the completion of the preparation process for the reaction force control device 40. Further, since the vehicle can travel, there is a high probability of the occurrence of theft or the like.

The vehicle control device 60 starts up the powertrain of the vehicle, and thereafter, executes the process for stopping the operation of the powertrain, when the vehicle stop request signal S3 has been turned on. Thereby, the vehicle cannot travel. Accordingly, the vehicle is restrained from becoming the state of being capable of traveling before the completion of the preparation process of the reaction force control device 40. Further, the vehicle is restrained from being maintained in the state of being capable of traveling by malfeasance such as spoofing, even though the reaction force control device 40 is executing the preparation process.

Second Stop Request Determination Process

Next, the second stop request determination process will be described. The second stop request determination process is basically executed in accordance with the above flowchart of FIG. 6. However, the determination condition that is used in step S201 includes the following condition A4, in addition to the above two conditions A1 and A2.

The condition A4 is a condition that the remote function has been turned off. The determination condition is set such that the turning-on of the preparation completion signal S1 due to the turning-on of the remote function of the vehicle is allowed with the securement of the function to stop the traveling of the vehicle in the case where the preparation completion signal S1 is turned on before the preparation process for the reaction force control device 40 is completed.

The reaction force control device 40 executes the second stop request determination process in accordance with the above flowchart of FIG. 6. In step S201, the reaction force control device 40 determines whether it is necessary to stop the start-up of the powertrain of the vehicle. When all of the three conditions A1, A2 and A4 are satisfied, the reaction force control device 40 determines that it is necessary to request the vehicle control device 60 to stop the powertrain. When at least one of the three conditions A1, A2 and A4 is not satisfied, the reaction force control device 40 determines that it is not necessary to request the vehicle control device 60 to stop the powertrain.

Fifth Pattern of Starting Sequence

Next, a fifth pattern of the starting sequences will be described. The electric power source of the vehicle has been turned off.

As shown in a time chart of FIG. 10, when the remote function of the vehicle has been turned on through the operation of the portable terminal (time T31), the vehicle control device 60 turns on the vehicle electric power source. When the vehicle electric power source has been turned on, the reaction force control device 40 starts, and sequentially executes the initial check, the middle-point learning process, and the rudder angle synchronization process. After the starting, the reaction force control device 40 acquires a remote signal S5 from the vehicle control device 60 (T32). The remote signal S5 is an electric signal indicating whether the remote function has been turned on.

When the vehicle electric power source has been turned on, the vehicle control device 60 starts the execution of the starting preparation for the powertrain. After the completion of the starting preparation, the vehicle control device 60 starts up the powertrain, and turns on the preparation completion signal S1 (time T33). In the example of FIG. 10, for example, the preparation completion signal S1 is turned on during the middle-point learning process for the reaction force control device 40. The turning-on of the preparation completion signal S1 is due to the turning-on of the remote function.

Based on the remote signal S5, the reaction force control device 40 recognizes that the remote function has been turned on. When the remote function has been turned on, basically, the vehicle cannot travel. For example, the remote function is the remote air-conditioner function, and is turned on when the vehicle is in the parking state. In the parking state, the shift range of the vehicle is maintained in the parking range.

Since the condition A4 of the above three conditions A1, A2 and A4 is not satisfied, the reaction force control device 40 determines that it is not necessary to stop the powertrain. Therefore, the reaction force control device 40 maintains the vehicle stop request signal S3 in the off-state, even when the preparation completion signal S1 has been turned on in the middle of the execution of the middle-point learning process. This is, for example, because the vehicle cannot travel and therefore safety is secured even before the completion of the preparation process for the reaction force control device 40.

Since the vehicle stop request signal S3 has not been turned on, the powertrain is maintained in the start-up state. Accordingly, the traveling of the vehicle is restrained from being prohibited even though the remote function has been turned on by the authorized user of the vehicle. For example, in the case where the remote function is the remote air-conditioner function, the user can get in the vehicle in which the temperature in the vehicle cabin has been adjusted to an appropriate temperature, to cause the vehicle to travel.

Sixth Pattern of Starting Sequences

Next, a sixth pattern of the starting sequences will be described. The electric power source of the vehicle has been turned off. The remote function has been turned off.

Figure 11:
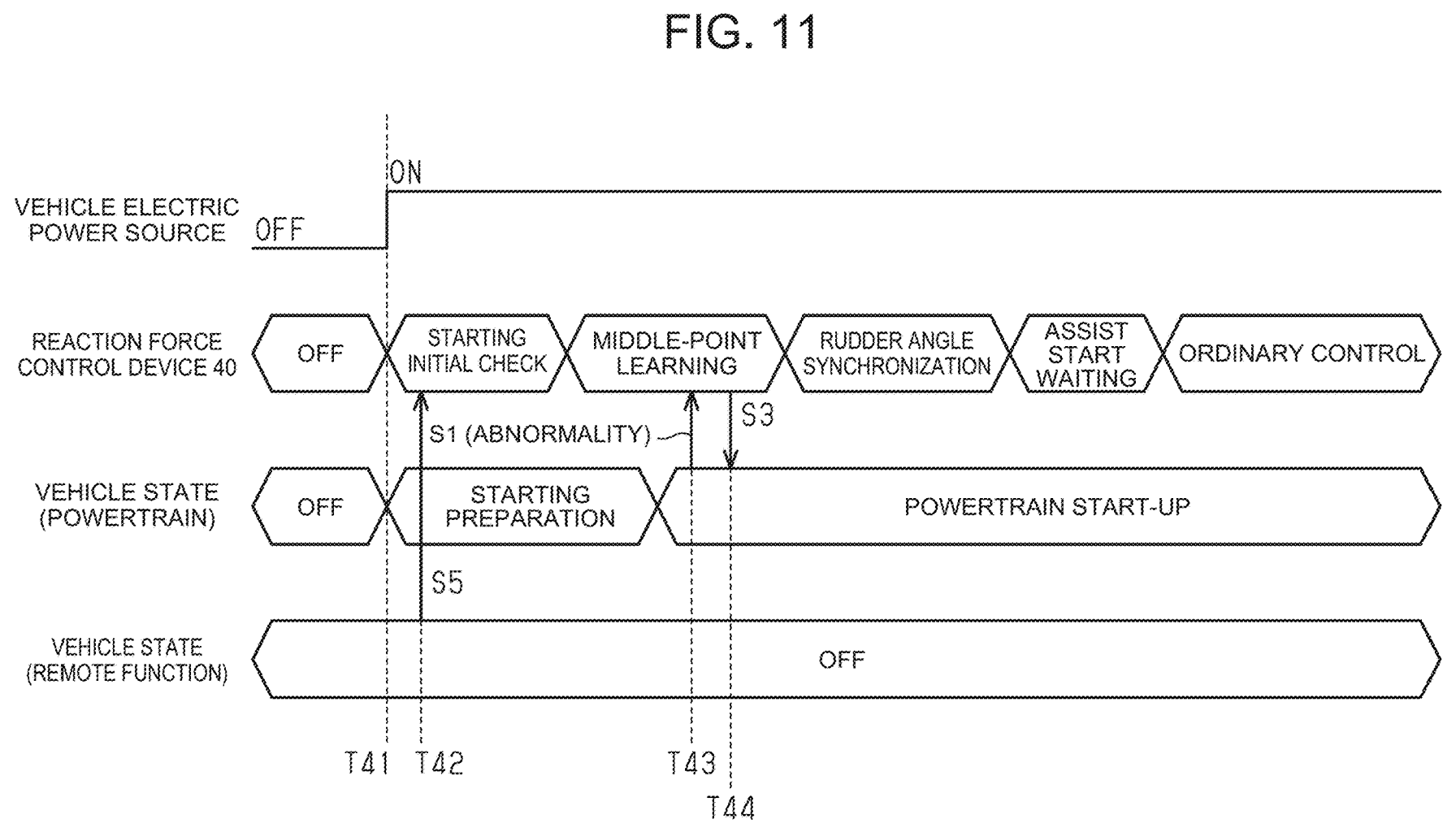

As shown in a time chart of FIG. 11, when the vehicle electric power source has been turned on (time T41), the reaction force control device 40 starts, and sequentially executes the initial check, the middle-point learning process, and the rudder angle synchronization process. After the starting, the reaction force control device 40 acquires the remote signal S5 from the vehicle control device 60 (time T42). The remote signal S5 is an electric signal indicating whether the remote function has been turned on.

For example, when the preparation completion signal S1 has been turned on in the middle of the execution of the middle-point learning process (time T43), the reaction force control device 40 turns on the vehicle stop request signal S3 (T44). The preparation completion signal S1 is not an ordinary preparation completion signal S1 that responds to the start-up permission signal S2 turned on by the reaction force control device 40. The preparation completion signal S1 is, for example, an abnormal preparation completion signal S1 due to spoofing, or an abnormal preparation completion signal S1 turned on by the vehicle control device 60 at an improper timing.

Based on the remote signal S5, the reaction force control device 40 recognizes that the remote function has been turned off. Since all of the above three conditions A1, A2 and A4 are satisfied, the reaction force control device 40 determines that it is necessary to stop the powertrain. Therefore, the reaction force control device 40 turns on the vehicle stop request signal S3.

The vehicle control device 60 starts up the powertrain of the vehicle, and thereafter, executes the process for stopping the operation of the powertrain, when the vehicle stop request signal S3 has been turned on. Thereby, the vehicle cannot travel. Accordingly, the vehicle is restrained from becoming the state of being capable of traveling before the completion of the preparation process of the reaction force control device 40. Further, the vehicle is restrained from being maintained in the state of being capable of traveling by malfeasance such as spoofing, even though the reaction force control device 40 is executing the preparation process.

Effects of Embodiment

The embodiment exerts the following effects. (1) In the case where the vehicle electric power source has been turned on and where the exchange of the information has been performed with the vehicle control device 60 so as not to follow the preset pattern, the reaction force control device 40 requests the vehicle control device 60 to stop the traveling of the vehicle. For example, the exchange of the information includes the recognition of the turning-on of the start-up permission signal S2 by the vehicle control device 60 and the recognition of the preparation completion signal S1 by the reaction force control device 40. For example, the preset pattern includes a pattern in which the reaction force control device 40 turns on the start-up permission signal S2 and thereafter the vehicle control device 60 turns on the preparation completion signal S1 in response to the turning-on of the start-up permission signal S2. In the case where this configuration is employed, there is concern that the information that is exchanged between the reaction force control device 40 and the vehicle control device 60 may be faked due to some kind of malfeasance. Further, there is concern that the vehicle control device 60 turns on the preparation completion signal S1 at an improper timing due to some kind of cause. In this regard, in the embodiment, when the exchange of the information has been performed between the reaction force control device 40 and the vehicle control device 60 so as not to follow the preset pattern, the operation of the powertrain is stopped. The vehicle cannot travel by the dynamic power of the traveling drive source, and therefore, crime prevention performance is enhanced.

However, even when the exchange of the information has been performed between the reaction force control device 40 and the vehicle control device 60 so as not to follow the preset pattern, the reaction force control device 40 does not request the vehicle control device 60 to stop the powertrain, in the case where the vehicle is not in the state of being capable of traveling. Since the vehicle is not in the state of being capable of traveling, safety or crime prevention performance can be secured.

(2) For example, the reaction force control device 40 executes the first stop request determination process. In this case, the case where the vehicle is not in the state of being capable of traveling is the case where the shift range of the vehicle is not a shift range that allows the traveling. For example, the shift range that does not allow the traveling includes the parking range and the neutral range. In the case where the shift range is the parking range or the neutral range, the vehicle cannot travel by the dynamic power of the traveling drive source. The shift range is a condition appropriate to determine whether the vehicle is in the state of being capable of traveling.

(3) For example, the reaction force control device 40 executes the second stop request determination process. In this case, the case where the vehicle is not in the state of being capable of traveling is the case where the remote function has been turned on. For example, the remote function is used when the vehicle is in the parking state. Therefore, in the case where the remote function has been turned on, the vehicle is in the parking state, that is, in the state where the vehicle cannot travel by the dynamic power of the traveling drive source. The turning-on of the remote function is a condition appropriate to determine whether the vehicle is in the state of being capable of traveling.

(4) In the case where the preparation process for the reaction force control has been completed, the reaction force control device 40 permits the vehicle control device 60 to start up the powertrain. The permission to the vehicle control device 60 is performed by the turning-on of the start-up permission signal S2 by the reaction force control device 40, for example. The vehicle control device 60 starts up the powertrain, after the start-up of the powertrain is permitted by the reaction force control device 40. Therefore, the vehicle can travel only after the completion of the preparation process for the reaction force control device 40. Accordingly, the traveling of the vehicle can be started in a safer state for the driver.

(5) When the start-up of the powertrain is recognized even though the reaction force control device 40 has not permitted the vehicle control device 60 to start up the powertrain, there is a risk that the permission to the vehicle control device 60 has been faked by malfeasance such as spoofing, for example. The faking of the permission to the vehicle control device 60 is faking by which the start-up permission signal S2 is turned on, for example. The start-up of the powertrain can be recognized based on the turning-on of the preparation completion signal S1, for example. In the embodiment, when there is a risk that the permission to the vehicle control device 60 has been faked, the reaction force control device 40 requests the vehicle control device 60 to stop the operation of the powertrain. The request for the stop of the operation of the powertrain is performed by the turning-on of the vehicle stop request signal S3 by the reaction force control device 40, for example. The vehicle control device 60 stops the operation of the powertrain in response to the request from the reaction force control device 40, and thereby, crime prevention performance is enhanced.

(6) When the remote function has been turned on, the vehicle control device 60 starts up the powertrain without the permission by the reaction force control device 40. Therefore, there is a risk that the reaction force control device 40 requests the vehicle control device 60 to stop the operation of the powertrain. However, in the case where the vehicle is not in the state of being capable of traveling, the reaction force control device 40 does not request the vehicle control device 60 to stop the operation of the powertrain, even when the powertrain has been started up without the permission by the reaction force control device 40. Therefore, the start-up of the powertrain due to the turning-on of the remote function is allowed, with the securement of the function to stop the operation of the powertrain in the case where the powertrain has been started up without the permission by the reaction force control device 40. Accordingly, the convenience for the user is secured.

(7) The preparation process for the reaction force control device 40 includes the middle-point learning process and the rudder angle synchronization process. For example, in the case where the traveling of the vehicle has been started even though the reaction force control device 40 is executing the middle-point learning process or the rudder angle synchronization process, there is a risk that it is difficult for the driver to operate the steering wheel 11 in an intended steering direction. This is because the steering wheel 11 automatically rotates during the execution of the middle-point learning process or during the execution of the rudder angle synchronization process. In this regard, in the embodiment, the reaction force control device 40 permits the vehicle control device 60 to start up the powertrain, in the case where the preparation process for the reaction force control has been completed. Therefore, the vehicle can travel only after the completion of the preparation process for the reaction force control device 40. Accordingly, the traveling of the vehicle can be started in a safer state for the driver. A feeling of strangeness is not given to the driver.

Other Embodiments

The embodiment may be carried out while being modified as follows. The preparation completion signal S1, the start-up permission signal S2, the vehicle stop request signal S3, the shift range signal S4, and the remote signal S5 may be flags.

In the embodiment, each of the reaction force motor 21 and the turning motor 31 includes the winding groups of the two systems, but may include a winding group of one system. In this case, the reaction force control device 40 may include only one of the first system circuit 41 and the second system circuit 42. Further, in this case, the turning control device 50 may include only one of the first system circuit 51 and the second system circuit 52. The first reaction force control circuit 41A or the second reaction force control circuit 42A corresponds to a reaction force control circuit. The first turning control circuit 51A or the second turning control circuit 52A corresponds to a turning control circuit.

What is claimed is:

1. A steering control device comprising a control circuit configured to control driving of a reaction force motor that generates steering reaction force that is given to a steering wheel, dynamic power transmission being not performed between the steering wheel and a turning wheel of a vehicle, wherein:

the control circuit is configured to request a vehicle control device to stop operation of a powertrain in a case where a vehicle electric power source has been turned on and where exchange of information has been performed with the vehicle control device so as not to follow a preset pattern, the vehicle control device controlling traveling of the vehicle, the powertrain including a traveling drive source of the vehicle;

the control circuit is configured to determine whether it is necessary to request the vehicle control device to stop start-up of the powertrain of the vehicle by determining whether the vehicle is in a state that is capable of traveling by the dynamic power transmission; and the control circuit is configured to not request the vehicle control device to stop the operation of the powertrain, even when the vehicle electric power source has been turned on and the exchange of the information has been performed with the vehicle control device so as not to follow the preset pattern, in a case where the control circuit has determined that it is not necessary to stop the start-up of the powertrain based on a result of the determination on whether the vehicle is in the state that is capable of traveling by the dynamic power transmission.

2. The steering control device according to claim 1, wherein;

the control circuit determines that it is not necessary to stop the start-up of the powertrain upon determining that the vehicle is not in the state that is capable of traveling by the dynamic power transmission, and the control circuit determines that the vehicle is not in the state that is capable of traveling by the dynamic power transmission when a current shift range of the vehicle is not a shift range that allows traveling by the dynamic power transmission.

3. The steering control device according to claim 2, wherein the shift range that allows traveling by the dynamic power transmission includes a reverse range and a drive range and does not include a parking range or a neutral range.

4. A steering control device comprising a control circuit configured to control driving of a reaction force motor that generates steering reaction force that is given to a steering wheel, dynamic power transmission being not performed between the steering wheel and a turning wheel of a vehicle, wherein:

the control circuit is configured to request a vehicle control device to stop operation of a powertrain in a case where a vehicle electric power source has been turned on and where exchange of information has been performed with the vehicle control device so as not to follow a preset pattern, the vehicle control device controlling traveling of the vehicle, the powertrain including a traveling drive source of the vehicle;

the control circuit is configured to not request the vehicle control device to stop the operation of the powertrain, even when the exchange of the information has been performed with the vehicle control device so as not to follow the preset pattern in a case where the vehicle electric power source has been turned on and where the vehicle is not in a state of being capable of traveling;

the vehicle has a remote function to remotely operate an electronic apparatus equipped in the vehicle using wireless communication when the vehicle is in a parked state; and the case where the vehicle is not in the state of being capable of traveling is a case where the remote function has been turned on.

5. The steering control device according to claim 4, wherein the control circuit is configured to permit the vehicle control device to start up the powertrain in a case where execution of a preparation process has been completed, the preparation process being executed at a time when the vehicle electric power source has been turned on, and transition to an ordinary control state in a case where the control circuit has recognized start-up of the powertrain through the vehicle control device, the ordinary control state being a state where a reaction force control to cause the reaction force motor to generate the steering reaction force is executed.

6. The steering control device according to claim 5, wherein the control circuit is configured to request the vehicle control device to stop the operation of the powertrain in a case where the control circuit has not permitted the vehicle control device to start up the powertrain and where the control circuit has recognized the start-up of the powertrain through the vehicle control device.

7. The steering control device according to claim 6, wherein:

the vehicle has a remote function to remotely operate an electronic apparatus equipped in the vehicle using wireless communication when the vehicle is in a parked state; and the vehicle control device is configured to start up the powertrain without permission by the control circuit in a case where the remote function has been turned on.

8. The steering control device according to claim 5, wherein the preparation process includes:

a middle-point learning process of learning a steering neutral position of the steering wheel by causing the steering wheel to operate to a first operation end and thereafter causing the steering wheel to reversely operate to a second operation end; and a rudder angle synchronization process of correcting a rotational position of the steering wheel such that the rotational position of the steering wheel corresponds to a turning position of the turning wheel.

9. The steering control device according to claim 4, wherein the case where the vehicle is not in the state of being capable of traveling includes a case where a shift range of the vehicle is a parking range or a neutral range.

10. The steering control device according to claim 1, wherein the control circuit is configured to permit the vehicle control device to start up the powertrain in a case where execution of a preparation process has been completed, the preparation process being executed at a time when the vehicle electric power source has been turned on, and transition to an ordinary control state in a case where the control circuit has recognized start-up of the powertrain through the vehicle control device, the ordinary control state being a state where a reaction force control to cause the reaction force motor to generate the steering reaction force is executed.

11. The steering control device according to claim 10, wherein the control circuit is configured to request the vehicle control device to stop the operation of the powertrain in a case where the control circuit has not permitted the vehicle control device to start up the powertrain and where the control circuit has recognized the start-up of the powertrain through the vehicle control device.

12. The steering control device according to claim 11, wherein:

the vehicle has a remote function to remotely operate an electronic apparatus equipped in the vehicle using wireless communication when the vehicle is in a parked state; and the vehicle control device is configured to start up the powertrain without permission by the control circuit in a case where the remote function has been turned on.

13. The steering control device according to claim 10, wherein the preparation process includes:

a middle-point learning process of learning a steering neutral position of the steering wheel by causing the steering wheel to operate to a first operation end and thereafter causing the steering wheel to reversely operate to a second operation end; and a rudder angle synchronization process of correcting a rotational position of the steering wheel such that the rotational position of the steering wheel corresponds to a turning position of the turning wheel.

\* \* \* \* \*